United States Patent [19]

Boegeman

[11] 3,728,734
[45] Apr. 17, 1973

[54] METHOD OF RESOLVING MULTIPLE SWEEP AMBIGUITIES ENCOUNTERED IN HIGH RESOLUTION GRAPHIC RECORDERS AND THE LIKE

[75] Inventor: Dwight E. Boegeman, San Diego, Calif.

[73] Assignee: The United States of America as represented by the Secretary of the Navy

[22] Filed: Apr. 23, 1971

[21] Appl. No.: 136,807

[52] U.S. Cl...........................346/1, 346/65, 340/3 R
[51] Int. Cl................................................G01d 18/00
[58] Field of Search......................346/33 EC, 139 A, 346/65, 62, 1; 340/3 R

[56] References Cited

UNITED STATES PATENTS 2,941,183  6/1960  Bischof.................................340/3 R
2,982,940  5/1961  Fryklund..............................340/3 R Primary Examiner—Joseph W. Hartary
Attorney—R. S. Sciascia and Paul N. Critchlow

[57] ABSTRACT

A high resolution recording system is one in which the signal transit time significantly exceeds the recorder sweep so that N sweeps occur before the first recorded return. Thus, it becomes a problem to determine which sweep from time zero is represented by a recorded mark. This problem is referred to as the multiple sweep ambiguity. To resolve the ambiguity, the recorder sweep speed (stylus velocity) can be varied a small amount, such as 5 percent, and a series of marks made at this increased sweep speed. These marks will be offset a distance equal to N/20 of a sweep where N is the unknown number of elapsed sweeps. A measurement of the offset distance provides a permanent index representative of the total elapsed time.

6 Claims, 3 Drawing Figures

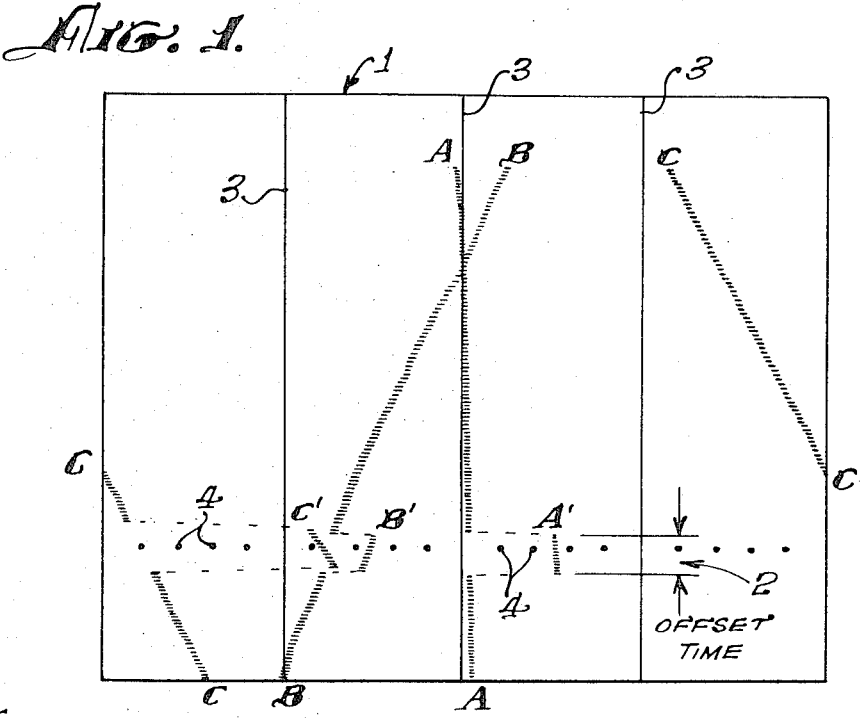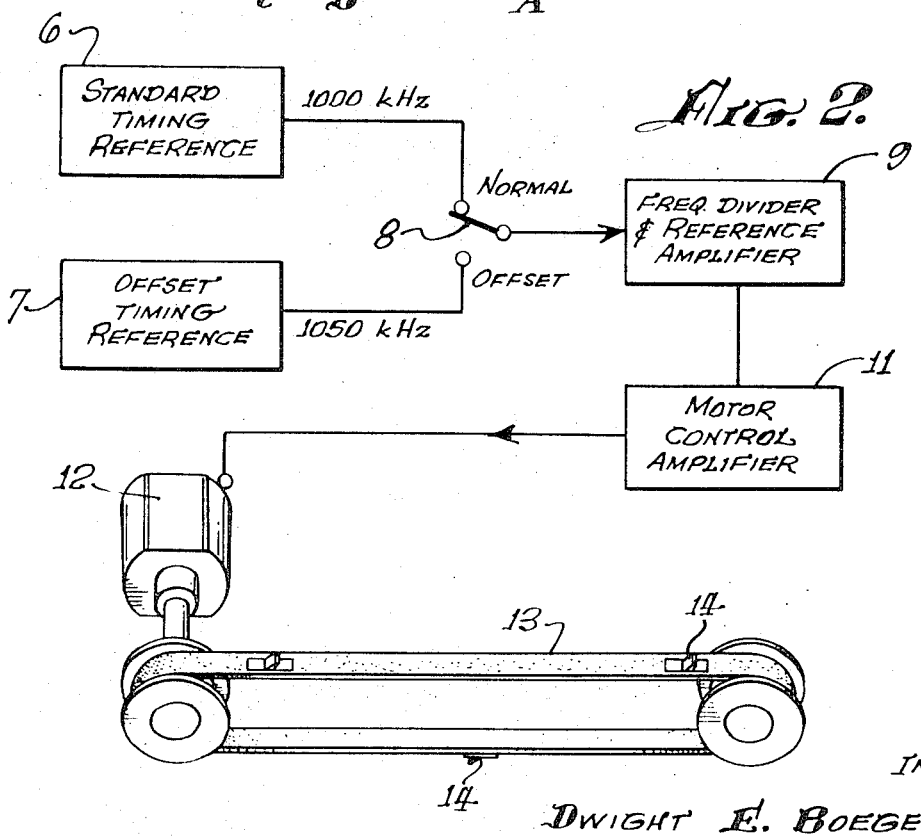

INVENTOR.
DWIGHT L. BOEGEMAN

METHOD OF RESOLVING MULTIPLE SWEEP AMBIGUITIES ENCOUNTERED IN HIGH RESOLUTION GRAPHIC RECORDERS AND THE LIKE

BACKGROUND OF THE INVENTION

The present invention relates to high resolution recording systems and, in particular, to the use of these systems in sonar ranging that requires multiple sweeps.

High resolution graphic recorder systems are well known and rather widely used in sonar ranging to measure and record the travel time of a sonar signal to provide an accurate determination of the distance which the signal travels. In such systems, a range measurement begins at a time zero with the keying of the sonar transmitter and the recording stylus of the graphic recorder is synchronized with the keying to start a constant velocity sweep usually in a left to right direction across the paper of the recorder. In the simplest case, the transmitted ping returns as an echo before the completion of the sweep and is recorded as a dot on the paper. The distance D from the left edge of the paper to this dot is a measure of travel time and range.

In other circumstances, the travel time of the ping is longer than the sweep time of the stylus so that the return echo is recorded during some subsequent sweep. The measurement of this longer range must be based not only on the previously-mentioned distance D but also on the full distance across the recorder multiplied by a factor N which is the integral number of completed sweeps occurring prior to the recording of the return signal dot. However, there is no visually apparent way of associating any individual transmitted ping with the corresponding echo, so that the actual number of sweeps needed to produce the recorded dot is ambiguous. Such multiple sweep ambiguities occur when the graphic recorder is driven at high resolution speeds or, in other words, at speeds sufficient to provide expanded traces or data which obviously increases the accuracy and reliability.

A number of conventional techniques have been employed to resolve the multiple sweep ambiguity, some of the more commonly used techniques being stop watch method, a "six ping" method, multiple recorder systems and a skip ping system. The stop watch method employs a stop watch to time the travel of a single ping and obviously such a method works only under ideal signal to noise conditions. The six ping method also relies upon an accurate count of the pings after the keying has been stopped and this method has the same limitations as the stop watch method. The multiple recorder method not only requires at least two recorders which must be perfectly synchronized but, since the technique provides a gross range estimate taken from the recorder having the slowest sweep speed, the information density becomes quite low and the system does not work well under poor signal to noise conditions. The skip ping method has been the most successful and most modern recorders offer the necessary switches and control to permit its use. In general, this method employs a technique of pinging on every other sweep (one of every two sweeps) and recording on the first or second of the sweeps. It thus becomes possible to determine if the unknown number of sweeps is odd or even since, for example, a recording on the first sweep indicates an odd number while the recording on the second sweep indicates an even number. Next, if the pinging is on every third sweep, an echo recording made on the first sweep will indicate a total sweep number of 1, 4, 7, etc. Similarly a recording on the second sweep will indicate a total number of 2, 5, 8, etc. and a recording on a third sweep will indicate a total number of 3, 6, 9, etc. Eventually sufficient information can be obtained to deduce the gross range. Although this skip ping method can be used under poor signal to noise conditions, it has certain drawbacks, such as the fact that a pinging on less than every sweep lowers the data rate. Also, the gating-out of returning data further degrades the signal being tested as well as results in a loss of information from signals that are not being tested. In multiple transponder navigation applications, it is possible to entirely lose track of two transponder ranges while attempting to determine a third. Another difficulty is that sometimes it becomes impossible to recheck after the fact to determine if the records were indeed marked correctly and, as will be apparent, such testing is at best very time consuming to the extent that the solution of each problem may take from 20 minutes to an hour depending upon the information needed to accurately deduce the gross range.

In view of the difficulties that have been experienced, one of the primary objects of the present invention is to provide a method of resolving multiple sweep ambiguities which is relatively fast, simple, accurate and which is effective under relatively poor signal to noise conditions.

Another important object is to provide a method to resolve the ambiguity with the loss of relatively little data.

Another object is to provide a method of resolving the ambiguity while at the same time providing on the recorder paper a permanent indication of the gross range such as will permit after-the-fact rechecking of the data.

Yet another object is to provide a method of resolving ambiguities which can be used in relatively complex transponder navigation situations as well as graphic depth recording and which lends itself to completely automated, unambiguous depth recording.

Other objects and their attendant advantages will become more apparent in the ensuing description.

The objects of the invention are achieved principally by employing the so-called "offset" technique which will be described in detail.

BRIEF DESCRIPTION OF THE DRAWINGS

The invention is illustrated in the accompanying drawings of which:

FIG. 1 is a simulated transponder record showing several offsets produced in accordance with the principles of the present invention;

FIG. 2 illustrates, in block diagram form, a particular crystal reference oscillator technique for changing the sweep speed of the recorder to produce the offset data needed for resolution of the multiple sweep ambiguity.

DETAILED DESCRIPTION OF THE INVENTION

Figure 3:
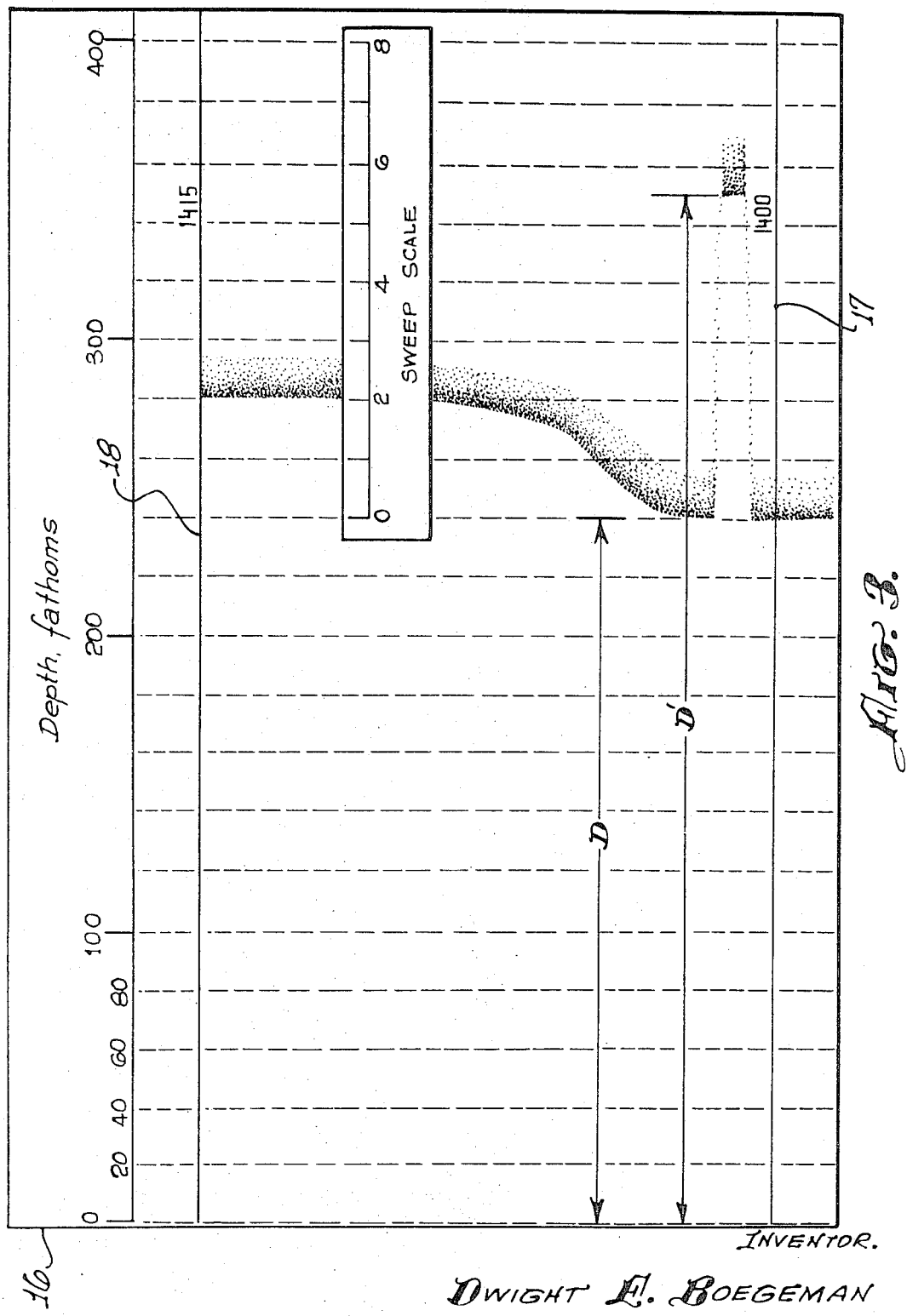
FIG. 3 represents a graphic recorder echo sounding record showing both the normal gross range data and the offset reference data needed to resolve the present ambiguity.

Referring to FIG. 1, sheet 1 is intended to represent a standard record made by moving the stylus of a conventional high resolution graphic recorder across the sheet to periodically record echo signals as a series of data which form traces to provide range information as well as slope and other pertinent data. The stylus (not shown) of such a recorder is driven at a desired constant speed transversely across sheet 1 from its left to its right-hand edge (FIG. 1) and the stylus is synchronized with or keyed to a sonar transmitter so that the stylus starts its uniform sweep with the keying or generation of the sonar transmitter signal. High resolution recorders employ relatively rapid sweep rates that provide a more accurate expanded scale for the desired information but, as has been stated, they also give rise to ambiguities when the travel time of the signal is longer than the time required for a single relatively rapid sweep of the stylus across the sheet.

Referring in particular to information presented on sheet 1, it will be seen that it includes three traces identified as A—A, B—B and C—C. These particular traces are made at what can be considered as a normal, constant stylus speed or velocity which usually is fast to provide the required high resolution. The present invention provides a quick and simple manner of determining for each dot or trace the particular number of sweeps required to produce the trace. Before continuing, it perhaps should be pointed out that the traces are produced by moving the recorder sheet relative to the stylus, the direction of the movement usually being normal to the path of the stylus movement.

The present invention utilizes the so-called offset technique. The first step is to record a sufficient number of returns to form traces or data index lines A—A, B—B and C—C. Next, the stylus drive is varied to increase or decrease its sweep time by some relatively small amount, such as by an amount equal to 5 percent of its normal constant speed. As will be seen in FIG. 1, this change in sweep time causes the data lines to shift so as to produce traces A', B' and C' which, as will be noted in FIG. 1, are produced during a period of time designated as the offset time and indicated in FIG. 1 by reference numeral 2. The magnitude of the shift or, in other words, the displacement between normal trace A—A and trace A', is proportional to the travel time of the signal and the incremental change in sweep time. Using, for example, a change of 5 percent, a measurement of the displacement between A—A and A' yields a total time on a scale of 20 times the original scale. Thus, when the 5 percent sweep time increment is employed, the recorder can be run 20 times faster than the rate that normally would be needed to time the sound on one sweep. Other sweep time increments can be used. For example, a 1 percent increment would allow the recorder to be run 100 times faster and still resolve the ambiguity since the displacement would be made during a single sweep.

Looking again at FIG. 1, it will be noted that the sheet can be divided into four quadrants by vertical lines 3 and further that each quadrant can be subdivided into five equal parts using any appropriate indicia such as dots 4. These indicia are useful in situations in which the offset is produced by a 5 percent incremental change in sweep time since, as will be seen, the total number of dots is 20 and the distance between successive dots can be taken to represent the time required for a single sweep on the compressed time scale provided by the offset. In other words, it can be noted that the distance between trace A—A and A' is equal to 2½ sweeps while the distance between B—B and B' is about 1 sweep. Thus, the trace A—A is 1½ sweeps longer in time than trace B—B. Trace C—C can be measured in a like manner and it will be seen that its offset is five dots away from the trace or, in other words, almost five sweeps away. The incremental change in sweep time can be an increase or decrease depending to some extent upon the location of the original trace. Thus, a trace appearing at the right-hand side of sheet 1 might be more easily determined by reducing the sweep time to produce an offset to the left of the trace rather than to the right. It will be noted that trace C—C starts at the right-hand end of the sheet and continues on the left-hand end.

The manner in which the recorder is modified or built to cause it to change the speed necessary to perform the offset can be achieved in a number of ways and the particular way it is accomplished is of little importance to the operation of the system. FIG. 2 illustrates one particular manner of making the incremental change using alternate crystal reference oscillators such as oscillators 6 and 7 which are shown in block form and identified respectively as a "Standard Timing Reference" and an "Offset Timing Reference." A switch 8 is used to couple either of these oscillators to a frequency divider and amplifier 9, the output of which is applied to a motor control amplifier 11 to control the drive of motor 12. The motor drives a stylus belt 13 which carries recording pens 14 for marking the recorder sheet and providing the desired traces. Other means for producing desired velocity change might include a mechanical gear shift or belt changing device on the stylus drive, or the use of a different scale factor in the frequency divider of the "Standard Timing Reference." It might be pointed out that most high resolution graphic recorders have means for varying the speed so as to obtain the desired resolution. However, the present incremental change in sweep time is preferably a much smaller or fractional change than ordinarily would be used for high resolution purposes. It also is recognized that there are many types of recorders that can incorporate the present offset technique. Thus, if a recorder has the capacity of having its sweep momentarily delayed, the delay can produce a measurable offset for resolving sweep ambiguities.

FIG. 3 is another recorder trace made on a sheet 16, the difference between FIG. 3 and FIG. 1 being that FIG. 3 represents echo sounding traces while FIG. 1, as stated, is a simulated transponder record. Applying the present offset method to the information shown on FIG. 3, the recorder sweep speed first is set sufficiently fast to produce the required resolution and, assuming the use of the alternate crystal reference oscillators of FIG. 2, switch 8 would be set to couple the motor control to standard timing reference 6. With the stylus being so set, a sufficient number of returns are recorded to form a data index or line identified as line D on FIG. 3. Next, switch 8 (FIG. 2) is thrown to change the sweep speed and the resulting displaced data line D' is formed. As will be noted on FIG. 3, the offset occurred shortly after 1400, this time reference being drawn onto sheet 1 as line 17. Another time reference marked 1415 appears as line 18 on the sheet. A relatively short period of time was used to produce the offset following which the recorder was switched back to its original sweep speed to continue data line D. Thus, very little data loss results from the offset testing which resolves the multiple sweep ambiguity.

The shift in the data line (D' − D) is the offset and is a usable representation of the gross range. In practice, a sweep scale 19 can be used as a ruler to measure from the original data line to the offset data. Each index on the sweep scale represents a single sweep. By use of the scale, it is readily seen that the number of sweeps (N) equals 5.

To calculate (D' − D) it first should be noted that sound travel time T is related to D by $$T = (NS + D)/V \quad (1)$$

where $N$ is the unknown number of complete sweeps and $S$ *is the distance across the recorder*. $V$ is the velocity of the recording stylus, and $D$ is the displacement of the data line. Keeping the percent of velocity change small enough so $N$ does not change, $D'$ can be expressed by $$T = (NS + D')/(V + \Delta V) \quad (2)$$

From equations (1) and (2) one obtains $$NS + D = (D' - D)/(\Delta V/V) \quad (3)$$

Showing that the gross range ($NS+D$) is proportional to ($D' - D$), the offset displayed by the recorder. A fractional change of velocity $\Delta V/V$ provides the scale factor. For example, as already indicated, a 5 percent change of stylus velocity yields an offset on a scale compressed 20 times compared to the original scale. If the recorder scale is subdivided into 20 parts as shown on FIG. 3, then an offset equal to one division represents one complete sweep. Again, the offset $D' - D$ in FIG. 3 shows that $N = 5$.

The advantages of the present method should be apparent from the foregoing description. It obviously is a relatively fast and unusually simple manner of resolving the multiple sweep ambiguity problem encountered in high resolution recorders. Also, in principle, the offset technique may be applied to any periodically recurring measurement. High resolution as well as the ability to work under poor signal to noise conditions are maintained and the technique lends itself easily to automated use. In practice, any reasonable number of returns may be offset at the same time whether or not they are on the same sweep. If the recorder is provided with 20 scale lines, a 5 percent offset factor is most useful since the offset becomes easily readable and unambiguous for 20 sweeps. Further, as has been demonstrated in numerous echo sounding records as well as transponder records, very little data is lost during the offset testing and the slopes of the traces are discernible during both normal speeds and offset speeds so as to match the offset traces with their proper original traces. Another important factor is that the offset method leaves a permanent indication of gross range for the reassurance of the investigator after the fact.

Also, the addition of an automatic time marking generator utilizing the facsimile properties of the recorder and automatically offsetting at some regular interval permits a substantially completely automated unambiguous graphic depth recording technique.

Obviously many modifications and variations of the present invention are possible in the light of the above teachings. It is therefore to be understood that within the scope of the appended claims the invention may be practices otherwise than as specifically described.

I claim:

1. A method of resolving multiple sweep ambiguities encountered in recording devices having a constant sweep travel time for producing a consecutive series of marks each representing the travel time of a periodically-recurring signal comprising:

operating said recording device at said constant speed to produce a series of consecutive marks, said series representing a data index ($D$) for said periodically-recurring signal, momentarily varying said constant sweep time a known amount to produce another series of consecutive marks representing an offset data index ($D'$) for said signal, and measuring the distance between $D$ and $D'$, said distance representing the number of sweeps at said constant velocity required to produce a mark for said signal whereby said multiple sweep ambiguity can be resolved.

2. A method of resolving multiple sweep ambiguities encountered in recorders of a type having a constant velocity sweep arm for marking on a recording sheet the travel time of a relatively long periodically-recurring signal comprising:

driving said arm relative to said sheet at a constant velocity a sufficient period of time to provide a series of marks representing an original index ($D$) and formed by a plurality of said recurrent signals, varying the velocity of said arm a known amount, driving said arm relative to said sheet at said varied velocity a sufficient period of time to provide another series of marks representing an offset data index ($D'$) also formed by a plurality of recurrent signals, and measuring the distance between offset data index ($D'$) and original data index ($D$), said ($D' - D$) distance being representative of the number of sweeps required for each recurrence of said relatively long signal when said arm is driven at said constant velocity.

3. The method of claim 2 further including the step of returning said sweep arm to its normal velocity after said offset data index has been produced.

4. The method of claim 2 applied to high resolution sonar ranging recorders having a variable speed stylus arm synchronized with a sonar transmitter to produce a mark representative of the return of each signal generated by the transmitter, said periodically-recurring signal being the return echo of the transmitter-generated signal.

5. The method of claim 4 further including the initial step of adjusting the sweep velocity of the stylus for a desired degree of resolution.

6. The method of claim 4 wherein said sweep velocity is varied an amount equal to 5 percent of said constant velocity.

* * * * *